United States Patent
Browne et al.

(10) Patent No.: US 11,639,224 B2
(45) Date of Patent: May 2, 2023

(54) VEHICLE CONSUMER GOODS SYSTEMS AND METHODS

(71) Applicant: THE BOEING COMPANY, Chicago, IL (US)

(72) Inventors: Michael J. Browne, Hessen (DE); Andreas Godehart, Hessen (DE); Andre Lutz, Hessen (DE)

(73) Assignee: THE BOEING COMPANY

( * ) Notice: Subject to any disclaimer, the term of this patent is extended or adjusted under 35 U.S.C. 154(b) by 949 days.

(21) Appl. No.: 16/523,504

(22) Filed: Jul. 26, 2019

(65) Prior Publication Data
US 2021/0024215 A1    Jan. 28, 2021

(51) Int. Cl.
| | |
|---|---|
| *B64D 11/00* | (2006.01) |
| *A47B 31/06* | (2006.01) |
| *G06F 16/9038* | (2019.01) |
| *G06F 16/9035* | (2019.01) |
| *A47B 31/00* | (2006.01) |

(52) U.S. Cl.
CPC .......... *B64D 11/0007* (2013.01); *A47B 31/06* (2013.01); *G06F 16/9035* (2019.01); *G06F 16/9038* (2019.01); *A47B 2031/002* (2013.01)

(58) Field of Classification Search
CPC ............. B64D 11/0007; G06F 16/9038; G06F 16/9035; A47B 31/06; A47B 2031/002
USPC ......................................................... 186/38
See application file for complete search history.

(56) References Cited

U.S. PATENT DOCUMENTS

| | | | | |
|---|---|---|---|---|
| 8,543,259 B2* | 9/2013 | Schalla | .............. | B64D 11/0007 701/19 |
| 2009/0112377 A1* | 4/2009 | Schalla | ............ | B64D 11/00155 705/15 |
| 2013/0149679 A1* | 6/2013 | Tokuda | ................. | A47J 36/321 434/127 |
| 2017/0103360 A1* | 4/2017 | Ristock | ................... | H04L 67/52 |
| 2017/0103380 A1 | 4/2017 | Ristock et al. | | |
| 2017/0316488 A1* | 11/2017 | Kremen | ................... | G09B 5/06 |
| 2018/0308037 A1* | 10/2018 | Cloyd | .................... | B64D 11/04 |

FOREIGN PATENT DOCUMENTS

| | | | |
|---|---|---|---|
| FR | 3035073 B1 | 9/2018 | |
| NL | 2013635 B1 | 10/2016 | |

* cited by examiner

*Primary Examiner* — James A Shriver, II
*Assistant Examiner* — Hilary L Johns
(74) *Attorney, Agent, or Firm* — The Small Patent Law Group LLC; Joseph M. Butscher

(57) ABSTRACT

A system for consumer goods management includes at least one sensor and at least one processor. The at least one sensor is configured to identify consumables and provide tracking information corresponding to the consumables. The at least one processor configured to acquire consumption information for a trip to be performed; determine a meal plan based on the consumption information, the meal plan specifying a plurality of types of consumables, quantities of the types of consumables, and a storage arrangement of the types of consumables; and acquire the tracking information from the at least one sensor to implement the meal plan.

23 Claims, 7 Drawing Sheets

VEHICLE CONSUMER GOODS SYSTEMS AND METHODS

FIELD OF EMBODIMENTS OF THE DISCLOSURE

Embodiments of the present disclosure generally relate to systems and methods of managing consumer goods onboard a vehicle, such as a commercial aircraft.

BACKGROUND OF THE DISCLOSURE

Food and beverage items may be provided to passengers during a trip. Such items generally must be loaded onto a vehicle before performance of a trip, and may not be replenishable during the trip. Accordingly, if an incorrect quantity of a given consumable is loaded before the trip, passenger inconvenience may occur due to insufficient quantities, or waste and additional cost may result from overly large quantities.

SUMMARY OF THE DISCLOSURE

A need exists for a system and method of efficiently planning food and beverage inventories for trips.

With those needs in mind, certain embodiments of the present disclosure provide a system for consumer goods management that includes at least one sensor and at least one processor. The at least one sensor is configured to identify consumables and provide tracking information corresponding to the consumables. The at least one processor is configured to acquire consumption information for a trip to be performed; determine a meal plan based on the consumption information, the meal plan specifying a plurality of types of consumables, quantities of the types of consumables, and a storage arrangement of the types of consumables; and acquire the tracking information from the at least one sensor to implement the meal plan.

Certain embodiments of the present disclosure provide a system that includes a plurality of carts, at least one sensor, and at least one processor. The plurality of carts are configured for use on a vehicle performing a trip. The at least one sensor is configured to identify consumables disposed on the plurality of carts and to provide tracking information corresponding to the consumables. The at least one processor is configured to acquire a meal plan based on consumption information corresponding to the trip. The meal plan specifies a plurality of types of consumables, quantities of the types of consumables, an arrangement of the plurality of carts, and a corresponding group of consumables for each cart. The at least one processor is also configured to acquire the tracking information from the at least one sensor to implement the meal plan.

Certain embodiments of the present disclosure provide a method for consumer goods management that includes acquiring consumption information for a trip to be performed. The method also includes determining a meal plan based on the consumption information. The meal plan specifies a plurality of types of consumables, quantities of the types of consumables, and a storage arrangement of the types of consumables. Also, the method includes identifying, with at least one sensor, consumables and generating tracking information corresponding to the consumables, and implementing the meal plan using the tracking information.

DETAILED DESCRIPTION OF THE DISCLOSURE

Figure 1:
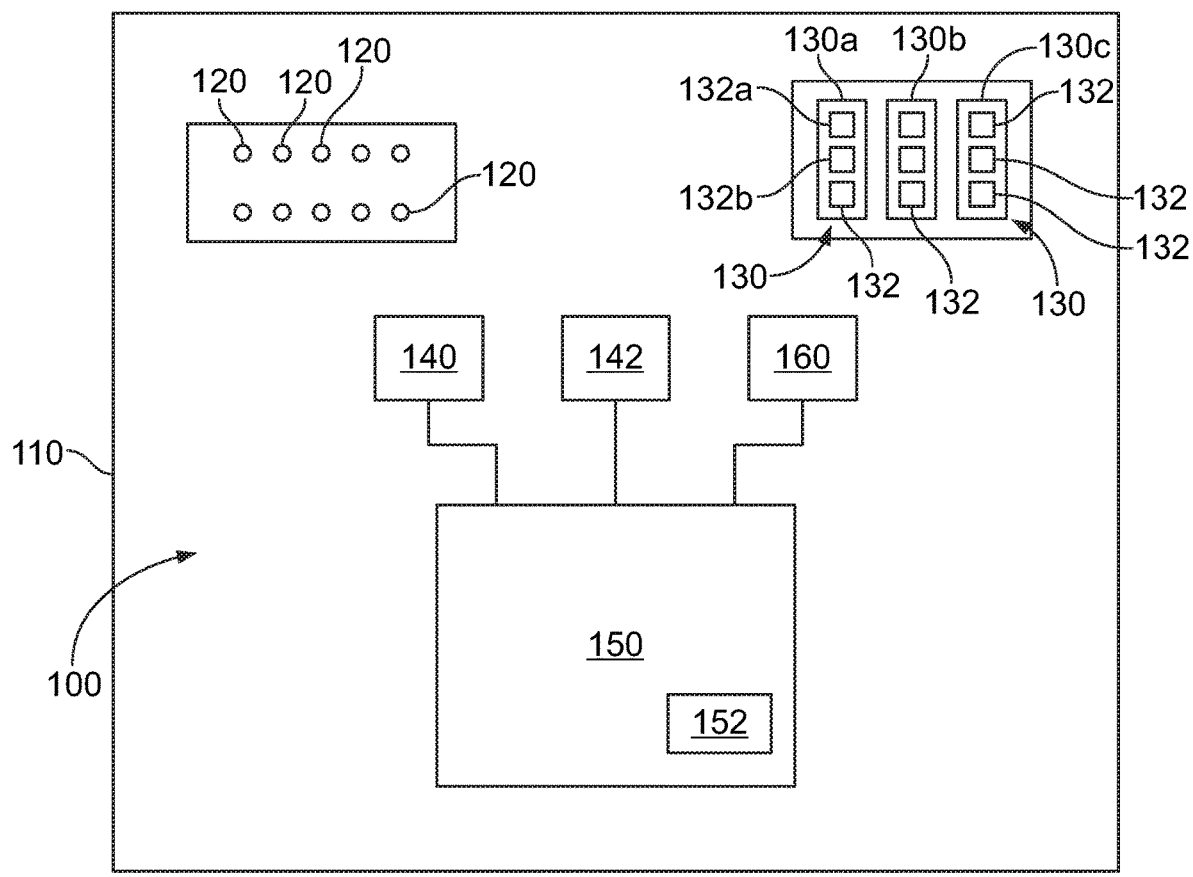
FIG. 1 is a schematic block diagram of a system for consumer goods management, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a vehicle consumer goods management system (and/or related methods) that provides for efficient planning and/or implementation of meal plans to be served on-board a vehicle during a trip and/or providing or distributing other consumer goods to passengers of a vehicle during a trip. Consumer goods in various embodiments may include food inventories such as food and/or beverages, and/or other consumer goods or consumables such as duty-free items. Generally, consumables as used herein includes food and beverages distributed on a vehicle during a trip as well as items sold to passengers and which can be removed on and off the vehicle. Accordingly, while meal plans are generally discussed in connection with food and drinks, it may be noted that in various embodiments meal plans may additionally or alternatively include other consumer goods, such as duty-free items. For example, based on consumption data for passengers on-board a vehicle for a trip, an optimal amount of food, drinks, and/or other consumables may be calculated. In various embodiments, information regarding flight times is automatically acquired and used to prepare and deliver food with improved freshness and punctuality. Barcodes and/or other tracking techniques may be employed to track food items or other consumables along a supply chain up to and including consumption and to track which items remain in stock. It may be noted that systems and methods disclosed herein may be used in connection with current and/or future trips. For example, various systems and methods provide for predicting for future trips (e.g., flights of an airline) consumption rates of various consumables and optimizing the consumables provided on-board accordingly.

In various embodiments, individual meals, drinks, or consumables are scanned or otherwise registered. Further, storage containers (e.g., carts) may also be scanned or registered, with each cart having a predetermined location in an order specified by the system. The predetermined location of each cart may be specified by a system, or as another example, specified by a user and used by the system. If a cart is identified at a position or order other than that previously specified, a warning message may be provided to facilitate movement of the cart to its predetermined location. For example, a warning message or alert may be provided as a pop-up notification on a tablet or other screen, and/or as an audible noise. Further, one or more sensors may be used to monitor conditions during the trip, for example to suggest and/or implement changes to the plan or order of carts previously specified.

Further, orders from passengers may be received from an on-board system and/or personal devices (e.g., smart phones). The orders may be registered and collated with tracking information corresponding to currently available food items or other consumables such as drinks. The collected data from the end of the trip may be used to update a model used to plan for upcoming trips, providing for more accurate planning, reducing food waste, reducing weight (which reduces the amount of fuel used resulting in reduced fuel costs), and improving customer satisfaction. In various embodiments, rules used to create and/or implement the model may be provided and/or tailored for a particular end user (e.g., operator of an airline) to accommodate preferences of the end user.

FIG. 1 provides a schematic block view of a system 100 in accordance with various embodiments. Generally, the system 100 is utilized to plan the types and amount of consumables (e.g., individual food items, prepackaged meals, beverages, or the like) for use on-board a vehicle during a trip and/or to manage food delivery to passengers during the trip. It may be noted that the system 100 may be utilized in connection with other consumer goods such as duty free items (e.g., cigarettes, magazines, souvenirs, and/or other consumer goods) alternatively to or in addition to food and drink items. It may further be noted that the illustrated system 100 is depicted as disposed entirely on-board a vehicle 110 (e.g., commercial airplane); however, in various embodiments, one or more aspects may be disposed off-board. For example, one or more aspects may communicate remotely with the vehicle 110, or, as another example, one or more aspects may be utilized off-board in connection with planning. The depicted example is discussed in connection with an airplane; however, it may be noted that in alternate embodiments the system 100 may be used in connection with other types of vehicles or trips, such as trains, ships, or buses.

In the illustrated embodiment, the system 100, which is disposed on-board vehicle 110, is configured to facilitate the providing of consumables 132 (e.g., food and/or beverages) to passengers 120. The depicted system 100 includes a plurality of carts 130, a sensor 140, and a processing unit 150. Generally, the sensor 140 is configured to track the location of various consumables 132 during a trip (e.g., flight), with the processing unit 150 using tracking information provided by the sensor 140 to implement and/or update a meal plan or consumables distribution plan during the trip.

The plurality of carts 130 are configured for use on the vehicle 110 during a trip. Each cart 130 holds various consumables 132. The consumables may be of different types 132a, 132b, etc. and may include different types of food and/or drinks. The carts 130 in the illustrated example are arranged in a predetermined order specifying the placement of cart 130a, 130b, 130c for convenient use during a trip. For example, the cart 130a may be placed in a location initially more accessible than cart 130b or cart 130c, and be used to provide consumables 132 during an earlier part of the trip and/or to a group of passengers that will be served earlier. The particular consumables 132 on each individual cart 130 as well as the order and/or location of the carts 130 may be planned ahead of time and/or tracked during the trip. It may be noted that different end users (e.g., different airlines) may have different cart placement preferences and in various embodiments the carts accordingly may be positioned based on user preferences.

The sensor 140 in the illustrated example is configured to identify consumables 132 disposed on the plurality of carts 130. The sensor 140 may also be used to identify individual carts 130. For example, individual consumables 132 may have a corresponding bar code, RFID chip, or other identifying marker based on the type of consumable 132, and the sensor 140 may be a reader configured to detect the bar code, RFID signal, or other identifying marker. Also, the sensor 140 is configured to provide tracking information corresponding to the consumables 132. For example, the sensor 140 may wirelessly communicate to the processing unit 150 tracking information that tracks, counts, and/or locates individual consumables 132 to the processing unit 150 for use in planning distribution of the consumables 132, modifying a distribution plan, and/or distributing the consumables 132.

It may be noted that a single sensor 140 is shown in the illustrated example for clarity and ease of illustration; however, multiple sensors 140 may be utilized in various embodiments. Further, in some embodiments, additional types of sensors may be employed. Generally, one or more sensors 140 may be used during planning, loading, storage, and/or distribution of consumables 132 during a trip.

The depicted processing unit 150 receives the tracking information from the sensor 140 and utilizes the tracking information to facilitate efficient distribution of the consumables 132. In the illustrated embodiment, the processing unit 150 is disposed on-board the vehicle 110, and is configured (e.g., programmed) to acquire a meal plan for a trip to be performed by the vehicle 110 (e.g., a flight). The meal plan is based on consumption information corresponding to the trip, and specifies a plurality of types of consumables (e.g., types of food items and/or beverages), quantities of the types of consumables, an arrangement of the plurality of carts 130 (e.g., based on the particular consumables 132 on a given cart 130), and corresponding group of consumables 132 for each cart. For example, the meal plan may specify particular types and quantities of consumables to be provided on each cart, as well as an order or arrangement of the carts to facilitate efficient delivery of the consumables based on an expected timing and quantities of expected deliveries to passengers 120. The meal plan may also specify preparation times for one or more consumables (e.g., times at which to start heating various food items and/or combining different portions of a meal). It may be noted that in some embodiments, an on-board processing unit may develop the meal plan, while in other embodiments the meal plan may be developed by an off-board processing unit (that may be part of system 100) and provided to the on-board processing unit by the off-board processing unit. For example, in some embodiments, a caterer or vendor may develop the meal plan using information from an operator that will perform the trip, and provide the meal plan to the operator performing the trip. In various embodiments, the meal plan may also specify the style or appearance of food, beverage, and/or other consumer good presentation. For example, users (e.g., airlines) have particular styles for how they serve their foods such as the placement of the foods on the plate and which foods go with which meal. The particular styles may be specified by the meal plan.

The processing unit 150 also acquires the tracking information from the at least one sensor 140 to implement the meal plan. The meal plan may be implemented via autonomous positioning of carts 130 (and/or individual consumables 132) and/or providing of instruction for delivery, such as by providing a prompt to a crew member. Implementing the meal plan by the processing unit 150 may also mean tracking locations of carts 130 and/or consumables 132 to confirm they are properly located. As another example, implementing the meal plan may include updating the meal plan, for example to reflect changes in availability of consumables 132 and/or conditions on-board the vehicle 110 during the trip.

It may be noted that while the processing unit 150 is depicted as a single on-board unit in the example of FIG. 1 for ease and clarity of illustration, in various embodiments, the processing unit 150 may include more than one individual unit, and may be additionally or alternatively disposed off-board the vehicle 110. For example, the processing unit 150 may be disposed off-board for use in connection with meal planning for the trip and/or preparation of consumables 132 for delivery to the vehicle 110. As another example, the processing unit 150 may include an off-board portion for planning and an on-board portion for implementation of the meal plan during a trip.

In various embodiments the processing unit 150 includes processing circuitry configured to perform one or more tasks, functions, or steps discussed herein. In various embodiments, the processing unit 150 may additionally control one or more aspects of the vehicle 110 before, during, and/or after performance of the trip. It may be noted that "processing unit" as used herein is not intended to necessarily be limited to a single processor or computer. For example, the processing unit 150 may include multiple processors, ASIC's, FPGA's, and/or computers, which may be integrated in a common housing or unit, or which may distributed among various units or housings. It may be noted that operations performed by the processing unit 150 (e.g., operations corresponding to process flows or methods discussed herein, or aspects thereof) may be sufficiently complex that the operations may not be performed by a human being within a reasonable time period. For example, the tracking of changes in available consumables and updating of a meal plan may rely on or utilize computations that may not be completed by a person within a reasonable time period.

The depicted processing unit 150 includes a memory 152. The memory 152 may include one or more computer readable storage media. The memory 152, for example, may store information regarding a received meal plan, passenger information, algorithms or processes for determining meal plan updates, or the like. Further, the process flows and/or flowcharts discussed herein (or aspects thereof) may represent one or more sets of instructions that are stored in the memory 152 for direction of operations of the system 100.

As discussed herein, in various embodiments, one or more aspects of the processing unit 150 may be disposed off-board the vehicle 110 and utilized in connection with meal planning. For example, in some embodiments, the processing unit 150 may be disposed partially or entirely off-board, and configured to acquire consumption information for the trip to be performed, determine the meal plan based on the consumption information, and acquire tracking information from the sensor 140 (and/or additional sensors 140) to implement the meal plan (e.g., implement organization of the consumables 132 off-board the vehicle 110, confirmation of the types, quantity and/or organization of the consumables 132, and/or delivery of the consumables 132 for loading on to the vehicle 110).

Generally, in various embodiments the processing unit 150 is configured to determine the meal plan using the consumption information for a current or upcoming trip based on known correlations between the consumption information and past demand for consumables. For example, the meal plan may be determined using a model that has been developed based on historical trends determined using consumption information from similar, previous trips. Generally, trends corresponding to demand for particular consumables 132 for particular types of consumption information (e.g., passenger characteristics, route, length of trip, or the like) may be identified and used to develop a meal planning model or otherwise predict the types and amounts of consumables 132 for a given upcoming trip. In the depicted embodiment, the meal plan specifies a plurality of types food items (e.g., different food and drink items), the quantities of the types of food items, and a storage arrangement of the types of food items (e.g., specifying how much of each item are place on each cart 130, and specifying the location of each cart 130 at an on-board location). The model may be tailored for user preferences. For example, the model may predict a lower amount of consumables for a user that prioritizes minimizing waste or left-overs, and predict a higher amount of consumables for a user that prioritizes not running out of items during a trip.

The consumption information, for example, may be acquired from a separate system or otherwise entered into the processing unit 150. Generally, the consumption information includes information regarding the particular passengers expected to be on-board the vehicle 110 during the trip. The consumption information may also include information regarding the trip (e.g., route and/or duration). For example, the consumption information may include an expected number of passengers, demographic information of passengers for the trip, route information for the trip, and/or individual passenger information corresponding to at least one individual passenger on the trip.

The demographic information generally includes information regarding the age, size, gender, frequency of travel, type of travel (e.g., business, pleasure, vacation, commuter) and/or other characteristics of the passengers of the trip. For example, trends in consumption of food items may correlate to age, so that a model used to predict consumption for the passengers of a given trip may use information regarding the age of the passengers to predict types and/or amounts of consumables expected to be used during the trip. The demographic information may be itemized (e.g., individual ages listed for each passenger and separately entered into a model) or averaged (e.g., an average age for all passengers entered as a single parameter into a model).

The route information generally includes information regarding the route over which the trip will occur. For example, the route information may include one or more of route origin, route destination, duration of route, time of day of route, and time of year of route. For example, different origins and/or destinations may correlate to higher demand for particular consumables. As another example, longer duration trips may correlate to higher demand for particular consumables and/or larger amounts of consumables. As another example, time of day of route may correlate to higher demand of particular consumables (e.g., trips starting in the morning may have higher demand for breakfast food items). As one more example, demand for various consumables may vary seasonally (e.g., more demand for cold drinks in summer and hot drinks in winter).

As discussed herein, the consumption information may also include passenger specific information. For example, one or more passengers may have an allergy to one or more food or drink items. As another example, passengers may be provided the option to pre-order certain consumables ahead of the trip. As one more example, passengers may have previously known preferences based on orders made by that particular passenger on previous trips. Accordingly, the consumption information may include general information regarding route characteristics and/or trends among general passenger characteristics used to develop a general meal plan, as well as passenger-specific information regarding individual passengers used to modify the general meal plan or tailor one or more aspects of the meal plan for specific passengers. For example, a meal plan may be generated that includes (or avoids) particular consumables based on particular passengers and/or determines positions for consumables based on corresponding passenger locations. For example, consumables may be positioned in one or more locations based on expected demand for those locations (e.g., more consumables of a given type placed in a cart to be used at an expected high-demand area, and less consumables of the given type placed in a cart to be used at an expected lower-demand area). Further, consumables may be located or tracked based on corresponding cart locations.

Accordingly, various consumption information (e.g., demographic information, route information, passenger-specific information) may be acquired and input into a model that makes predictions regarding expected demand for consumables for a given trip, with the model based on information from previous trips (e.g., consumables utilized during trips as evaluated using consumption parameters of the model). The processing unit 150 is configured in various embodiments to use a predictive method to determine a meal plan. The processing unit 150 in various embodiments uses such a model to determine which types of consumables (as well as how many of each) are used for each trip, as well as to organize the loading and storage of the consumables (e.g., to specify quantities of different types of consumables to be stored on particular carts and the order or placement of the carts on the vehicle). For example, if passengers in one section of a plane tend toward a given consumable, a larger proportion of that consumable may be placed on carts that will serve those areas. As another example, if a given consumable is expected to be in demand early during the trip, a larger proportion of that consumable may be placed on carts more easily accessed during the early portion of the trip. The parameters used to develop and use the model may include patient age, size, gender, route location, route duration, time of trip (time of day and/or seasonal variations), or the like. Generally, values for the parameters of the model may be collected from a number of previous trips to identify trends correlating demand for particular consumables with the values of the parameters from previous trips, and used to develop the model. Generally, the more parameters used the more accurate the model may be; however, use of a large number of parameters may also require a relatively large amount of historical information and/or processing resources. It may be further noted that the model may be updated using information obtained from subsequent trips. For example, the model may be used to predict the consumables expected for a given trip. After the given trip, the actually consumed food and drink items may be recorded and compared with the expected demand, and used to update the model as appropriate.

As discussed herein, the meal plan may be updated by the processing unit 150 on-board during the trip. For example, the meal plan may be updated in response to changes in available consumables and/or conditions during the trip. In various embodiments, the system 100 includes an environmental sensor 142. The environmental sensor 142 is configured to acquire environmental information corresponding to an environmental condition of the vehicle 110. The processing unit 150 acquires the environmental information from the environmental sensor 142 and updates the meal plan using the environmental information during the trip. For example, the environmental information may include atmospheric information (e.g., information regarding ambient conditions in the vehicle 110 such as temperature or humidity). Then, the meal plan may be altered accordingly. For example, if the temperature of the vehicle 110 is higher than normal, passengers may vary preferences responsive to the higher temperature (e.g., demand for cold drinks increases). Accordingly, the processing unit 150 may alter the meal plan to include more cold drinks. For example, additional cold drinks may be moved from a storage area on to the carts 130, or carts 130 with cold drinks may be re-arranged to be in a position of easier access.

As another example, the environmental information may include operational information describing or corresponding to the functioning of equipment onboard the vehicle 110. The processing unit 150 may alter one or more aspects of the meal plan to account for operational conditions described by the environmental information. For example, some food items may need to be heated in an oven before use. However, if the oven is not functioning properly, the meal plan may be altered. For example, the meal plan may specify a time for starting to heat certain food items. However, if the environmental sensor 142 detects a condition in which the oven is operating at reduced capability, the processing unit 150 may adjust the time to start heating the food items to an earlier time to allow for proper heating. Or, if the environmental sensor 142 indicates the oven is not functioning at all, the processing unit 150 may remove food items that require heating from the available options, and adjust the location of carts 130 based on whether those carts 130 have food that requires heating or not.

It may also be noted that for embodiments that include off-board planning, one or more sensors 140 may also be disposed off-board. For example, one or more sensors 140 may be disposed at a location for meal planning, consumable preparation, or consumable delivery, to track consumables during planning, preparation, or loading on to the vehicle 110. For example, bar code or RFID chip readers may be employed during preparation and/or loading to confirm that the proper amounts of consumables 132 are being prepared and provided, and/or confirm that the loading of individual carts 130 or the order of carts 130 on the vehicle 110 corresponds to the arrangement specified by the plan.

As discussed herein, the meal plan may be updated during the trip. For example, in some embodiments, the processing unit 150 is configured to track individual food items (e.g., food or drink items) removed from the plurality of carts 130, and to update the meal plan based on the removed items. For example, one or more sensors 140 may be used to identify consumables 132 that have been delivered from the carts 130 to the passengers 120, with the information sent to the processing unit 150. Then, the processing unit 150 adjusts the total number of available consumables 132 to remove the quantities already distributed, and make appropriate updates to the meal plan. In addition to tracking overall quantities, quantities on individual carts 130 may be tracked and used to implement and/or update the meal plan. For example, a given cart 130 may start running low, or run out of, a given consumable. Upon determining that a given cart 130 is low or out of the given consumable, the processing unit 150 may send an alert to crew members that a given cart 130 is low on the given consumable, so that the cart 130 may be replenished, or passengers seeking the consumable but in an area of the vehicle 110 serviced by a cart 130 that no longer has the consumable may receive the consumable from a different cart 130.

The depicted system 100 includes a display unit 160. While a single display unit 160 is shown, it may be noted that plural display units 160 may be employed in various embodiments. The display unit 160 of the illustrated example is shown on-board the vehicle 110; however, it may be noted that one or more display units 160 may additionally or alternatively be disposed off-board the vehicle 110 (e.g., for use in pre-trip planning and/or delivery procedures). The display unit 160, for example, may be a mobile unit (e.g., smart phone used by passenger and/or crew member), or may be a fixed unit mounted to or near a passenger chair or in a location accessible by crew members. The processing unit 150 provides a display via the display unit 160.

For example, the display may provide information regarding types of consumables in the meal plan, quantities of consumables, locations of consumables (and/or locations of associated carts 130), or the like. Further, the display may provide information regarding passengers including passenger allergies or passenger orders. In some embodiments, the display corresponds to an updated meal plan (e.g., changes to the updated meal plan or events that may affect the meal plan). In some embodiments, a display is provided that indicates quantities added (e.g., consumables scanned as they are added to an inventory) or quantities removed (e.g., consumables scanned as they are distributed to passengers). In some embodiments, updates to the meal plan made during the trip may be displayed to crew on-board the vehicle. Such updates may indicate an update due to environmental information (e.g., an alarm indicating a malfunctioning oven and/or changes to preparation times resulting from the malfunctioning oven), and/or may indicate changes to the meal plan due to quantities of distributed consumables (e.g., displays indicating how many of a given consumable remain, alerts that a given cart is out of a consumable and/or locations of alternate carts that still have the consumable). Displays may also provide information regarding running totals of consumables ordered by a particular passenger or group of passengers, prompts or alerts to begin preparation and/or distribution of particular consumables at a given time, individual passenger allergy and/or preference alerts, or the like.

Figure 2:
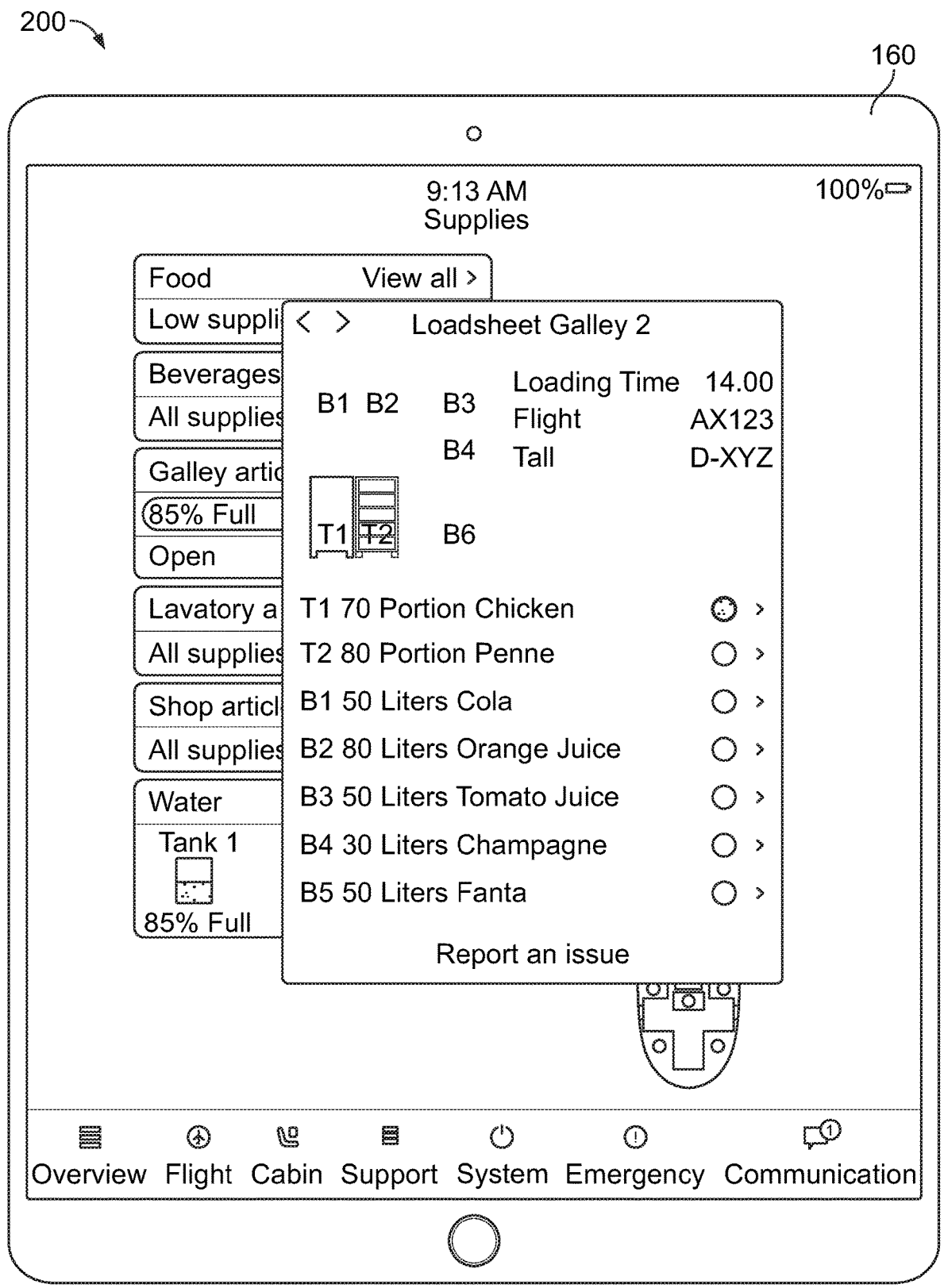
FIG. 2 depicts an example display, according to an embodiment of the present disclosure.

FIG. 2 provides a view of an example display 200 according to various embodiments. The display 200 includes labels and locations for boxes B1, B2, . . . B6, and carts T1, T2, as well as quantities of various consumables in the particular boxes and carts. The quantities may be updated as consumables are distributed to the passengers and/or moved between or among carts or boxes.

Figure 3:
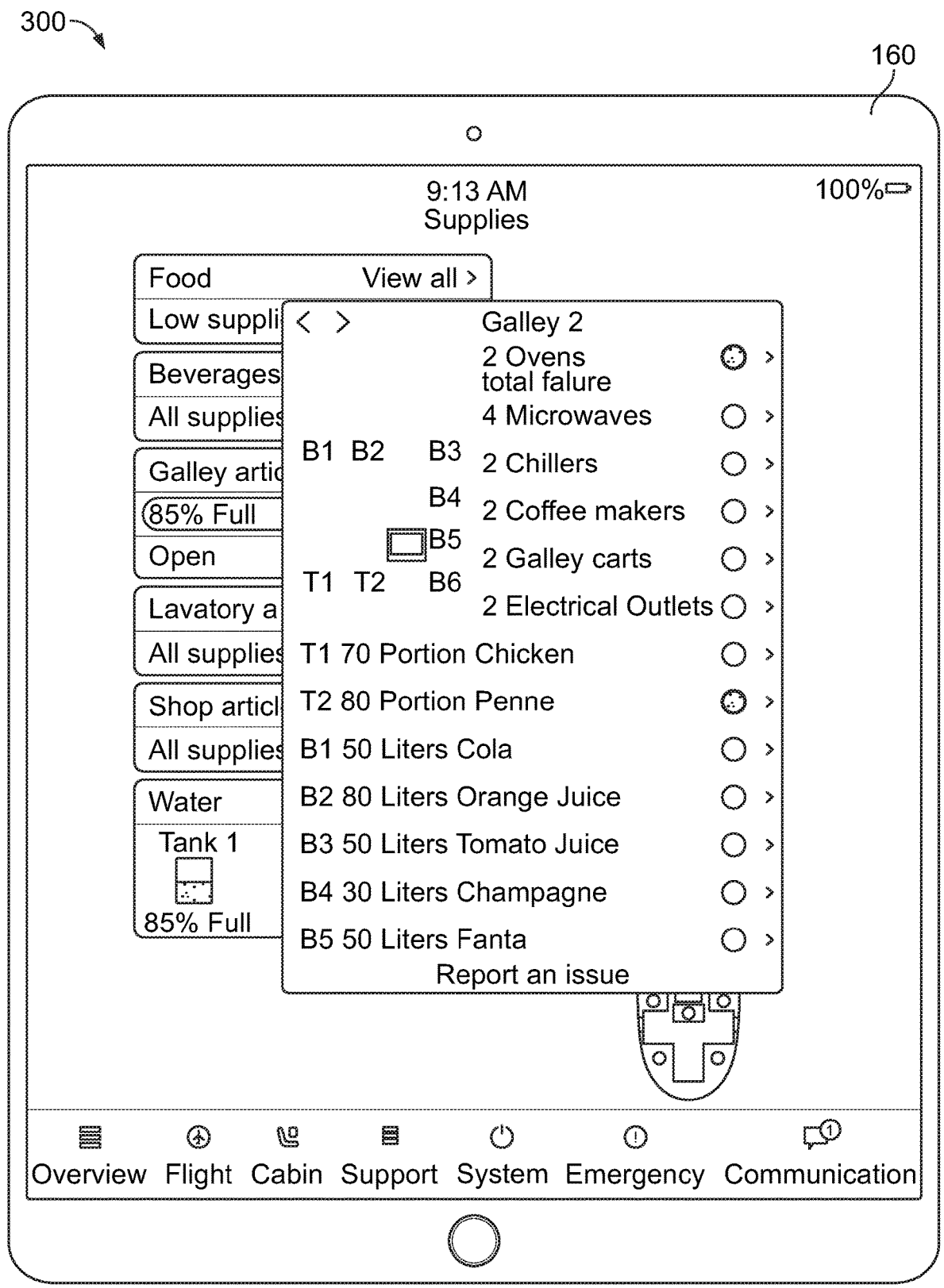
FIG. 3 depicts an example display, according to an embodiment of the present disclosure.

FIG. 3 provides a view of an example display 300 according to various embodiments. The display 300 includes an alert message regarding oven failures, and a prompt regarding a change to preparation of a consumable (e.g., penne in the illustrated example). For example, the meal plan may call for a predetermined quantity of penne to be prepared in the ovens at an initial predetermined time. However, due to the oven failure (e.g., as detected by an environmental sensor), the plan may be changed to prepare the penne at a different time than originally planned, and using one or more of the microwaves. The display 300 may be provided to a crew member to implement the change to the meal plan.

Figure 4:
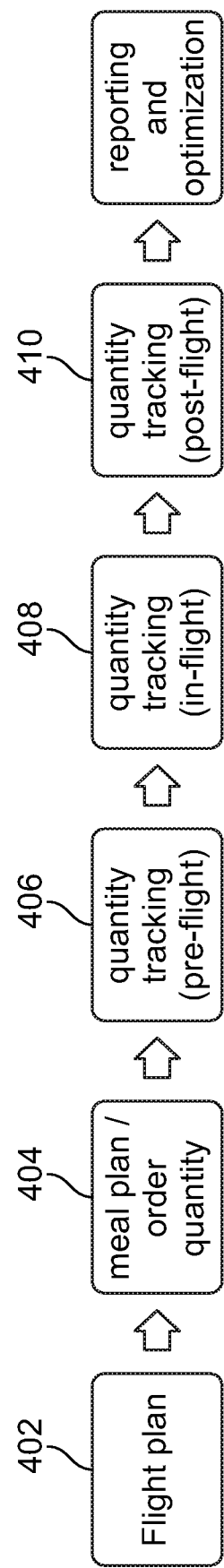
FIG. 4 is an example process flow, according to an embodiment of the present disclosure.

FIG. 4 provides a schematic view of a general process flow 400 in accordance with an embodiment of the present disclosure. In various embodiments, one or more aspects of the process flow 400 may be omitted, the order of various steps may be interchanged, one or more steps may be repeated, and/or one or more additional steps may be added.

In the illustrated example, at 402, a flight plan is determined. The flight plan, for example, may specify a route, start time, stop time, and passenger information (e.g., total number, ages, genders, past orders of consumables, allergies of particular passengers, or the like). Information specified by the flight plan may be used as an initial step in meal planning. At 404, the meal plan is determined and appropriate orders are made to obtain the desired types and quantities of consumables. The meal plan, for example, may be determined using information from the flight plan as inputs to a model for estimating or predicting demand for various consumables. At 406, quantities of consumables called for by the meal plan are tracked pre-flight. (It may be noted that the illustrated example is for a flight by a plane; however, other vehicles such as trains or ships may be utilized in other embodiments). For example, each item may be recorded as part of a starting inventory, with added items tracked to confirm the planned inventory is accurately fulfilled. Then, at 408, quantities are tracked in-flight. For example, as each time throughout the flight is purchased or ordered, the system may first check to insure that the item is in the inventory, and then deduct it from the available inventory quantity as it is distributed. At 410, quantities are tracked post-flight. For example, at 412, after a trip is completed, information regarding quantities of consumables actually utilized during the trip along with flight plan information from the trip (e.g., passenger and route information) may be transmitted and stored along with information from other trips to generate and/or update a model to be used for future meal planning. Accordingly, data collected from various trips may be compared against historical data. Food trends may be calculated and meal planning optimized to reflect food utilization during trips based on collected data such as flight origin, flight destination, time of flight, food served, food available, date of flight, duration of flight, number of passengers, and passenger personal data. Meal planning may accordingly be improved to provide improved convenience and efficiency, reduced cost of non-perishable goods (e.g., due to lower quantities of unused items), and/or reduced fuel cost (e.g., due to lower quantities of unused items).

Figure 5:
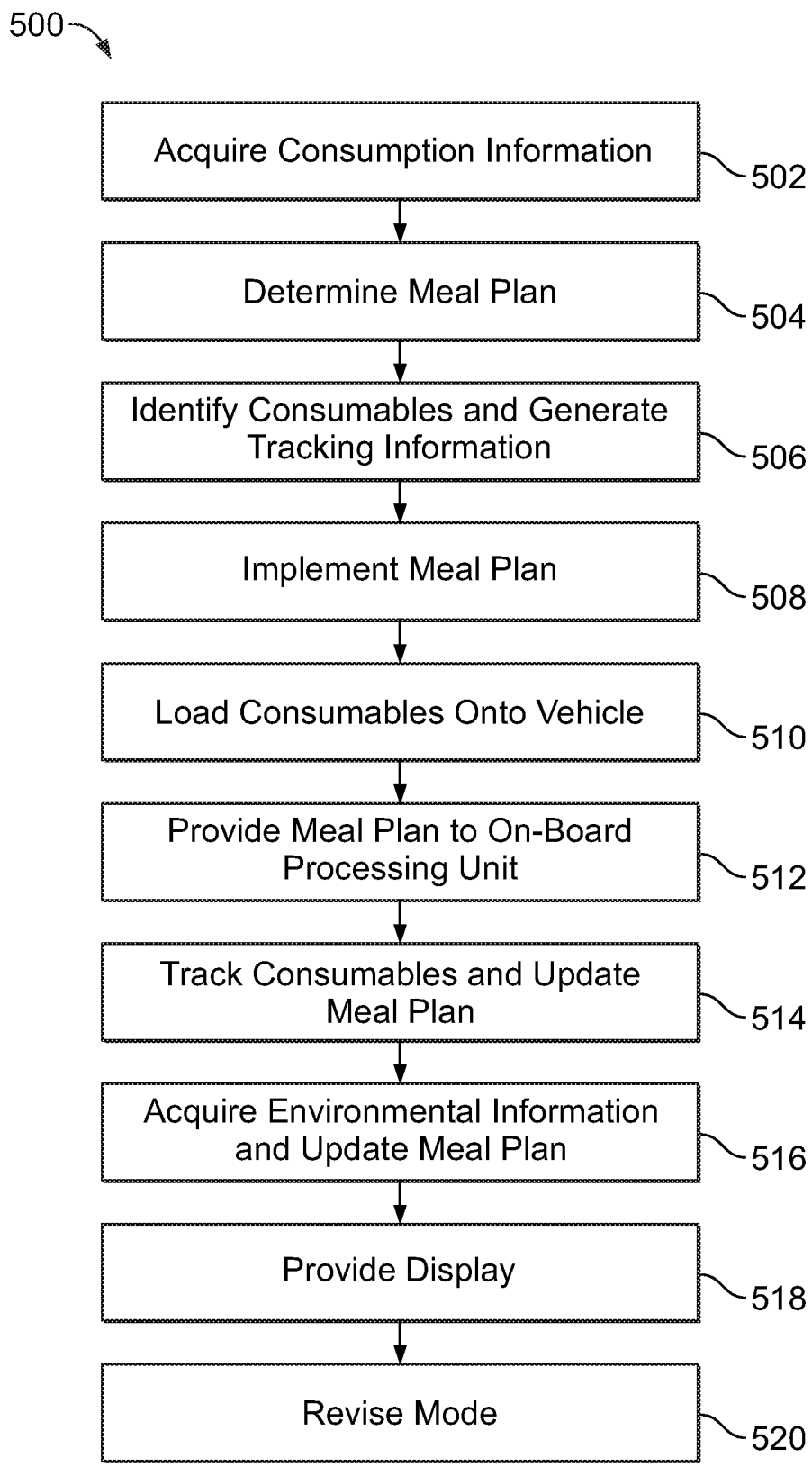
FIG. 5 is a flowchart of a method, according to an embodiment of the present disclosure.

FIG. 5 provides a flowchart of a method 500 (e.g., for planning and/or implementing a meal plan for a trip), in accordance with various embodiments. The method 500, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be able to be used as one or more algorithms to direct hardware (e.g., one or more aspects of the processing unit 150) to perform one or more operations described herein.

At 502, consumption information is acquired for a trip to be performed. The consumption information, for example, may include demographic information regarding passengers, flight information, and/or passenger specific information as discussed herein.

At 504, a meal plan is determined based on the consumption information. The meal plan specifies a plurality of types of consumables, quantities of the types of consumables, and a storage arrangement of the types of consumables. For example, the types and quantities of various consumables placed on particular carts for use during a flight may be specified, as well as an order, arrangement, or location of the carts.

At 506, consumables are identified with at least one sensor (e.g., sensor 140), and tracking information is generated corresponding to the food items. For example, bar codes, RFID chips, or the like may be used to track food items, with the information provided to an on-board and/or off-board processing unit (e.g., processing unit 150). Sensors may be utilized during preparation, loading, and/or distribution of consumables before and/or during a trip, for example, to tabulate quantities remaining of particular consumables and/or locations of available consumables.

At 508, the meal plan is implemented using the tracking information. For example, using the tracking information, identified consumables may be arranged for delivery to a vehicle and/or positioned on-board a vehicle. The consumables may be positioned autonomously, or by human operators receiving prompts or directions from a system. The meal plan may also be implemented by distributing the consumables during a flight, with the tracking information utilized to confirm correct quantities or availability of consumables, to track the location of consumables for distribution, and/or to update available quantities of consumables based on distributed consumables. The tracking information may be used to update the meal plan (e.g., to alter a meal plan based on one or more consumables becoming scarce or unavailable.

At 510 of the illustrated embodiment, the consumables specified by the meal plan are loaded onto a vehicle (e.g., vehicle 110) as part of implementing the meal plan. The meal plan may specify an arrangement of carts (e.g., carts 130) on the vehicle and a corresponding group of consumables for each cart.

At 512, the meal plan is provided to an on-board processing unit (e.g., processing unit 150). Accordingly, the meal plan may be directed or implemented by the processing unit (e.g., autonomously or using prompts or direction to crew members) during the trip. Also, the meal plan may be updated (e.g., due to changes in environment such as operating conditions of equipment used in connection with the consumables, and/or due to changes in quantities of available consumables).

At 514, individual consumables are tracked as they are removed from the plurality of carts, and the meal plan is updated based on the removed consumables. Accordingly, changes to the meal plan may be made during the trip to account for unexpected quantities of orders. For example, crew members may be provided information regarding alternate locations (e.g., carts) that have a given consumable when a given location (e.g., cart) is scarce or low on the consumable.

At 516, environmental information is acquired during the trip, and the meal plan is updated using the environmental information. The environmental information is acquired with an environmental sensor (e.g., environmental sensor 142) disposed on the vehicle. The environmental information corresponds to an environmental condition of the vehicle. For example, the environmental information may correspond to an atmospheric or ambient condition of the vehicle (e.g., temperature), or, as another example, correspond to operation of equipment on the vehicle used in connection with the meal plan (e.g., an oven).

At 518, a display is provided via a display unit (e.g., display unit 160). The display corresponds to an updated meal plan. For example, the display may provide an alert regarding an equipment malfunction along with a change to implementation of the meal plan (e.g., changing a time of preparing a food item). As another example, the display may provide updated information regarding available quantities of consumables and the locations of available consumables. The display unit may be a mobile unit, such as a smart phone.

At 520, a model used to provide the meal plan is revised. For example, quantities used of consumables may be totaled after the trip, and used along with trip information to determine the accuracy of the model's predictions, and/or change one or more aspects of the model based on discrepancies between predicted and actual use of consumables during the trip.

Figure 6:
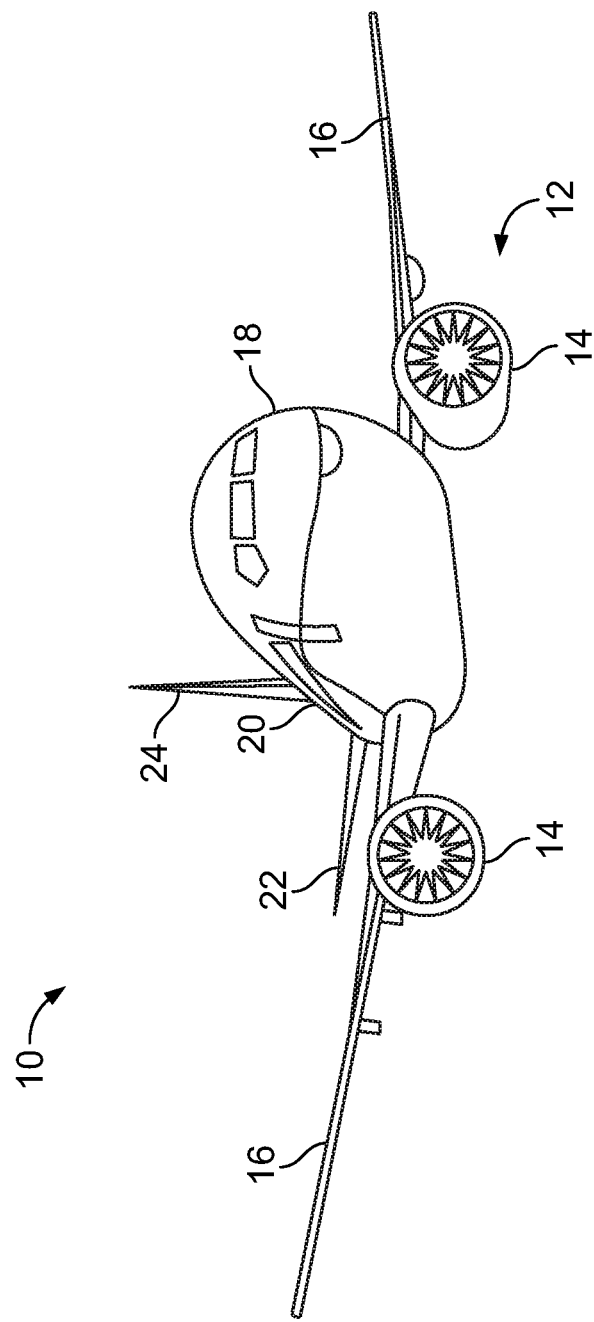
FIG. 6 is a diagrammatic representation of a front perspective view of an aircraft, according to an embodiment of the present disclosure.

The systems and/or method of the present disclosure may be used in connection with an aircraft. FIG. 6 is a diagrammatic representation of a front perspective view of a vehicle, such as an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and economy sections), and an aft section. Each of the sections may be separated by a cabin transition area, which may include one or more class divider assemblies. Overhead stowage bin assemblies may be positioned throughout the interior cabin. In various embodiments, the aircraft 10 may provide an example of the vehicle 110, and one or more aspects of the system 100 may be disposed within the aircraft 10 (e.g., within the interior cabin).

Figure 7A:
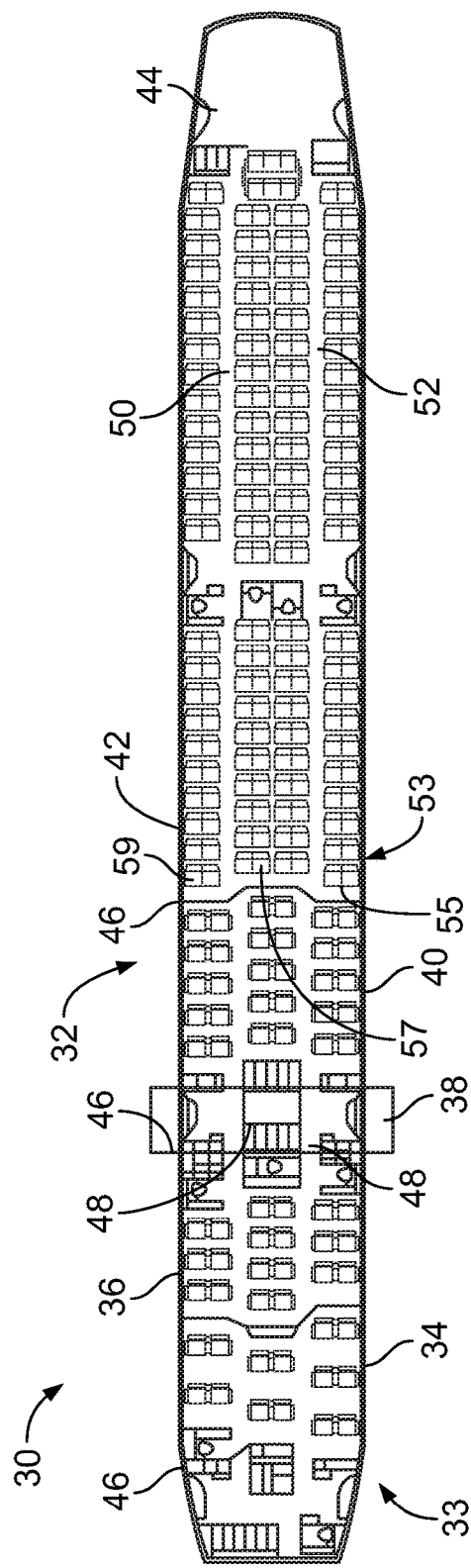
FIG. 7A is a diagrammatic representation of a top plan view of an interior cabin of an aircraft, according to an embodiment of the present disclosure.

FIG. 7A is a diagrammatic representation of a top plan view of an interior cabin 30 of an aircraft, according to an embodiment of the present disclosure. The interior cabin 30 is within a fuselage 32 of the aircraft 10 (shown in FIG. 6). For example, one or more fuselage wall members may define the interior cabin 30. The interior cabin 30 includes multiple sections or zones, including a front section 33, a first class section 34, a business class section 36, a front galley station 38, a business or an expanded economy or coach section 40, a standard economy or coach section 42, and an aft section 44, which may include multiple lavatories and galley stations. It is to be understood that the interior cabin 30 may include more or less sections and zones than shown. For example, the interior cabin 30 may not include a first class section, and may include more or less galley stations than shown. Each of the sections may be separated by a cabin transition area 46, which may include class divider assemblies between aisles 48.

As shown in FIG. 7A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

As shown, rows 53 of seats are within the interior cabin 30. A row 53 spans across the interior cabin and generally extends across the aisles 50 and 52. Columns 55, 57, and 59 of seat sections are perpendicular to the rows 53. Each seat section may include one or more seats. The columns 55, 57, and 59 generally run parallel with the aisles 50 and 52. A particular section or zone may include any number of columns 55, 57, and 59 of seat sections. As shown in FIG. 7A, at least one zone includes three columns 55, 57, and 59 of seat sections. However, each zone may include more or less than three columns. For example, a first class section or zone may include two columns of seat sections.

Figure 7B:
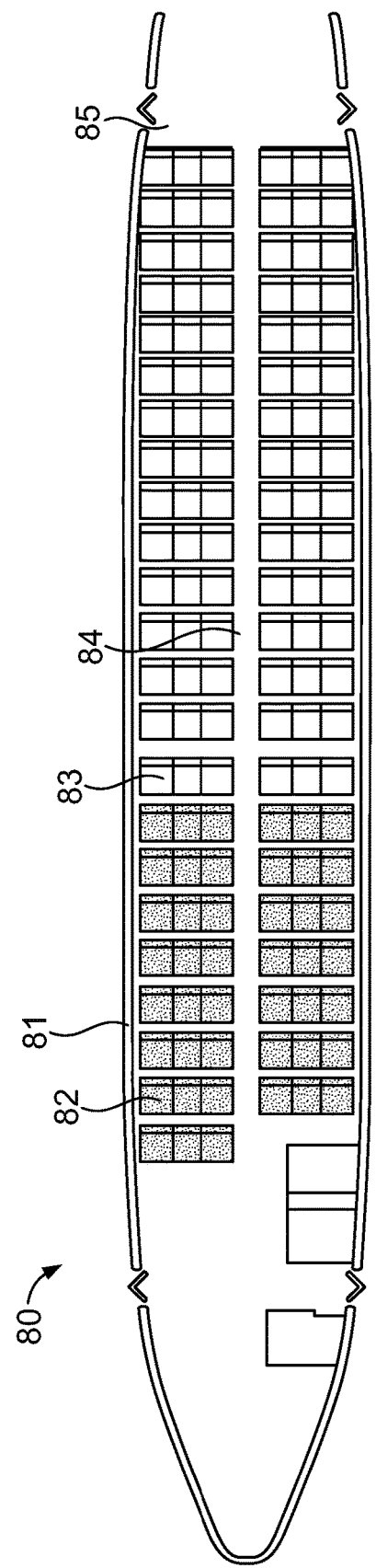
FIG. 7B is a diagrammatic representation of a top plan view of an interior cabin of an aircraft, according to an embodiment of the present disclosure.

FIG. 7B is a diagrammatic representation of a top plan view of an interior cabin 80 of an aircraft, according to an embodiment of the present disclosure. The interior cabin 80 may be within a fuselage 81 of the aircraft. For example, one or more fuselage wall members may define the interior cabin 80. The interior cabin 80 includes multiple sections or zones, including a main cabin 82 having passenger seats 83, and an aft section 85 behind the main cabin 82. It is to be understood that the interior cabin 80 may include more or less sections or zones than shown.

The interior cabin 80 may include a single aisle 84 that leads to the aft section 85. The single aisle 84 may extend through the center of the interior cabin 80 that leads to the aft section 85.

As used herein, the term "controller," "control unit," "processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control units 114 and 126 may be or include one or more processors that are configured to control operations, as described above.

For example, the processing unit 150 may be configured to execute a set of instructions that are stored in one or more data storage units or elements (such as one or more memories 152), in order to process data. The data storage units may also store data or other information as desired or needed. The data storage units may be in the form of an information source or a physical memory element within a processing machine.

The set of instructions may include various commands that instruct the processing unit 150 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the processing unit 150. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, processing unit 150 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As described herein, embodiments of the present disclosure provide systems and/or methods of efficiently planning and/or implementing a meal plan for a trip. Various embodiments provide systems and/or methods that improve passenger satisfaction, reduce waste, and/or reduce cost.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for consumer goods management comprising:
a plurality of carts configured for use on a vehicle;
at least one sensor configured to identify consumables and provide tracking information corresponding to the consumables; and
at least one processor configured to:
acquire consumption information for a trip to be performed;
determine a meal plan based on the consumption information, the meal plan specifying a plurality of types of consumables, quantities of the types of consumables, a storage arrangement of the types of consumables, an arrangement of the carts, and a corresponding group of consumables for each of the carts; and
acquire the tracking information from the at least one sensor to implement the meal plan.

2. The system of claim 1, wherein the at least one processor is configured to track individual consumables removed from the plurality of carts, and update the meal plan based on the removed individual consumables.

3. The system of claim 1, wherein the system includes a display unit, the at least one processor configured to provide a display via the display unit, the display corresponding to the meal plan.

4. The system of claim 1, wherein the at least one sensor includes an environmental sensor disposed on the vehicle, the environmental sensor configured to acquire environmental information corresponding to an environmental condition of the vehicle, the at least one processor configured to acquire the environmental information and to update the meal plan using the environmental information.

5. The system of claim 1, wherein the consumption information includes demographic information of passengers for the trip.

6. The system of claim 1, wherein the consumption information includes route information for the trip.

7. The system of claim 1, wherein the consumption information includes individual passenger information corresponding to at least one individual passenger on the trip.

8. The system of claim 1, wherein the at least one processor is configured to determine the meal plan using a predictive method.

9. The system of claim 1, wherein the meal plan also specifies a preparation time for one or more individual consumables.

10. A system for on-board consumer goods management comprising:
a plurality of carts configured for use on a vehicle performing a trip,
at least one sensor configured to identify consumables disposed on the plurality of carts and to provide tracking information corresponding to the consumables; and
at least one processor configured to:
acquire a meal plan based on consumption information corresponding to the trip, the meal plan specifying a plurality of types of consumables, quantities of the types of consumables, an arrangement of the plurality of carts, and a corresponding group of consumables for each cart; and
acquire the tracking information from the at least one sensor to implement the meal plan.

11. The system of claim 10, wherein the at least one processor is configured to track individual consumables removed from the plurality of carts, and update the meal plan based on the removed individual consumables.

12. The system of claim 10, wherein the system includes a display unit, the at least one processor configured to provide a display via the display unit, the display corresponding to the meal plan.

13. The system of claim 10, wherein the at least one sensor includes an environmental sensor disposed on the vehicle, the environmental sensor configured to acquire environmental information corresponding to an environmental condition of the vehicle, the at least one processor configured to acquire the environmental information and to update the meal plan using the environmental information.

14. The system of claim 10, wherein the at least one processor is configured to determine the meal plan using a predictive method.

15. A method for consumer goods management comprising:
acquiring consumption information for a trip to be performed;
determining a meal plan based on the consumption information, the meal plan specifying a plurality of types of consumables, quantities of the types of consumables, a storage arrangement of the types of consumables, an arrangement of carts on a vehicle performing the trip, and a corresponding group of consumables for each cart;
identifying, with at least one sensor, consumables and generating tracking information corresponding to the consumables; and
implementing the meal plan using the tracking information.

16. The method of claim 15, further comprising tracking individual consumables removed from the plurality of carts, and updating the meal plan based on the removed individual consumables.

17. The method of claim 15, further comprising providing a display via a display unit, the display corresponding to the meal plan.

18. The method of claim 15, further comprising acquiring environmental information with an environmental sensor disposed on the vehicle, the environmental information corresponding to an environmental condition of the vehicle, and updating the meal plan using the environmental information.

19. The method of claim 15, wherein the consumption information includes demographic information of passengers for the trip.

20. The method of claim 15, wherein the consumption information includes route information for the trip.

21. The method of claim 15, wherein the consumption information includes individual passenger information corresponding to at least one individual passenger on the trip.

22. The method of claim 15, wherein the meal plan is determined using a predictive method.

23. The method of claim 15, wherein the meal plan also specifies a preparation time for one or more individual consumables.

* * * * *